(No Model.) 2 Sheets—Sheet 2.

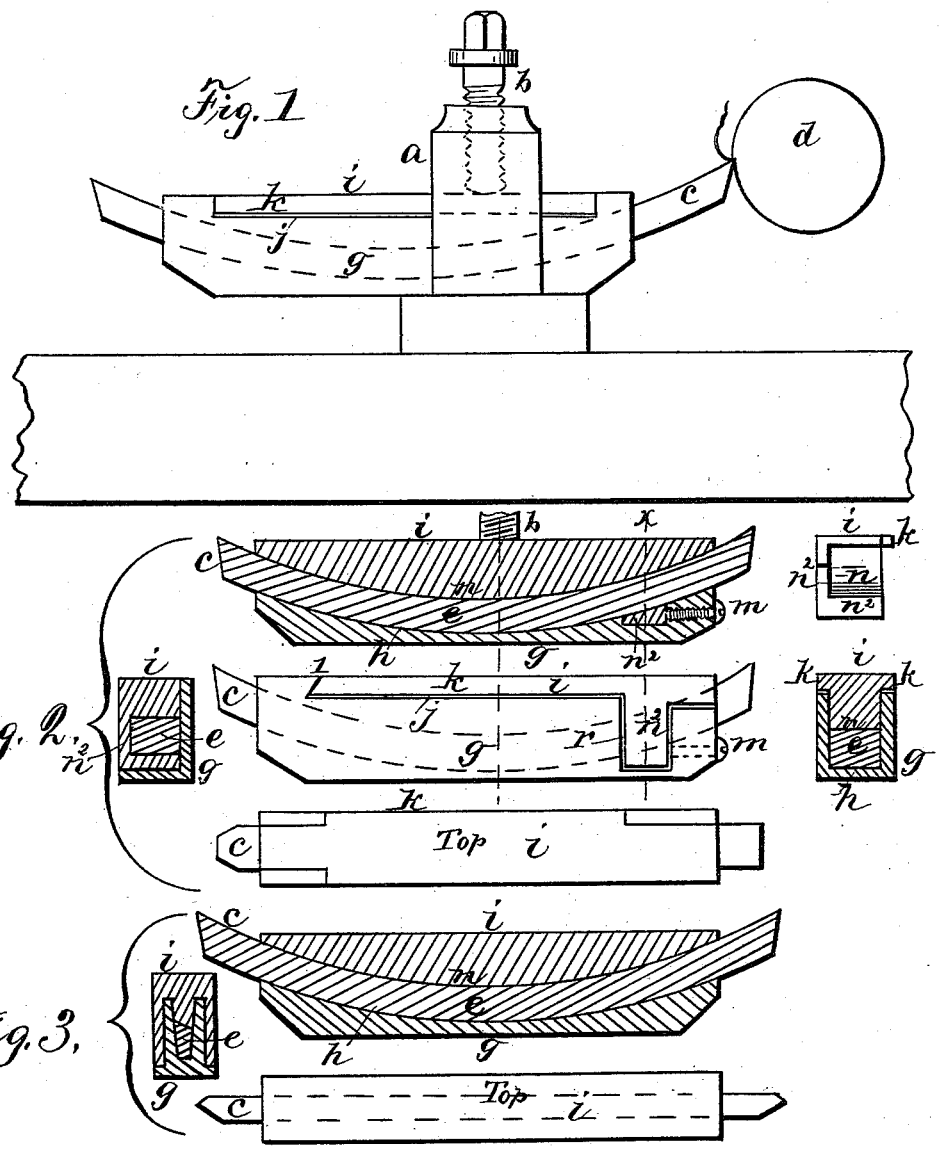

J. D. HALL.
LATHE TOOL.

No. 379,218. Patented Mar. 13, 1888.

Witnesses
Ella S. Johnson,
Wm. R. Mackville.

Inventor,
John D. Hall.
By his Attorneys
Johnson & Johnson

UNITED STATES PATENT OFFICE.

JOHN D. HALL, OF PHILADELPHIA, PENNSYLVANIA.

LATHE-TOOL.

SPECIFICATION forming part of Letters Patent No. 379,218, dated March 13, 1888.

Application filed March 31, 1887. Serial No. 233,136. (No model.)

*To all whom it may concern:*

Be it known that I, JOHN D. HALL, a citizen of the United States, residing at Philadelphia, in the county of Philadelphia and State of Pennsylvania, have invented new and useful Improvements in Lathe-Tools, of which the following is a specification.

I have improved the tool for use in the machinist's lathe and planer; and the objects of my improvement are to avoid the necessity of forge-dressing; to provide a uniform cutting-edge as it wears; to provide a cutter of uniform thickness and curvature, the said curvature being in the arc of a circle to permit of being used without reforging and until used up; to provide a double-ended cutter having a uniform curve and thickness from end to end, and to provide a stock adapted for setting out such a cutter as it is used and for different work, and in which the durability of the cutter is greatly increased.

Figure 4:
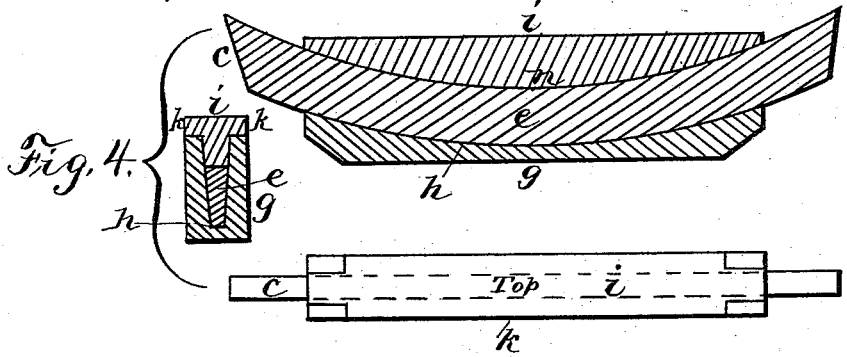
Figure 5:
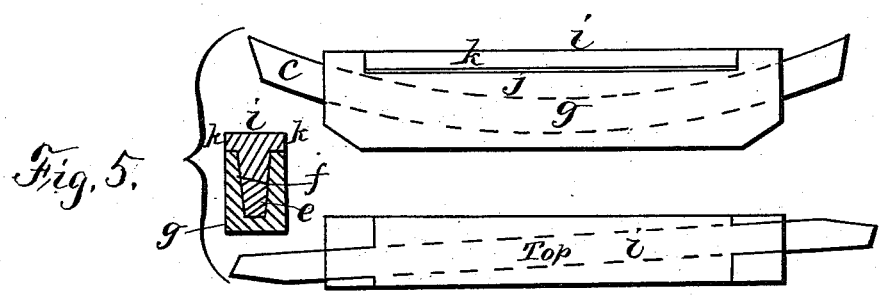
Figure 6:
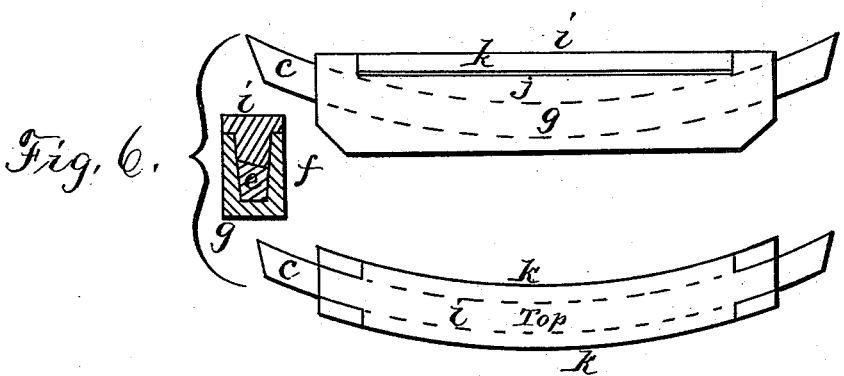
Figure 7:
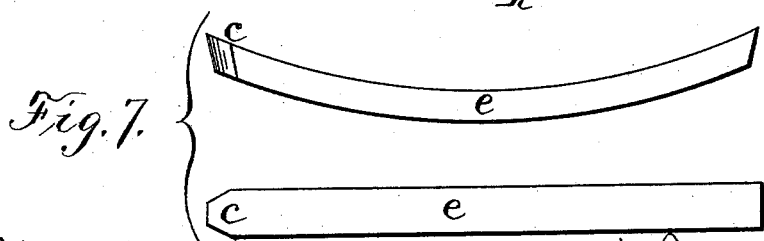

Referring to the drawings, Figure 1 represents my improved lathe-tool in side view as it is used with the lathe slide and post. Fig. 2 shows my improved lathe-tool in side and top views and in longitudinal and cross sections, in which the follower, its stock, and cutter are shown as being secured together, the cross-section being taken on the line *x x*. Fig. 3 shows the tool in longitudinal and in cross section and in top view, in which the stock is made for greater stiffness. Fig. 4 shows similar views of a cut-off tool embracing my improvement. Fig. 5 shows similar views of a side tool, and Fig. 6 shows similar views of a facing-tool having my improvement, and Fig. 7 shows the curved cutter-strip in side and top view.

In Fig. 1 my improved tool is shown as being clamped to the tool-post *a* by the screw *b*, so as to present the cutter *c* to the work *d*.

The lathe-tool in general use is formed of a steel bar with the cutter proper forged at one end, so that it will bear grinding but a few times before it requires a forge-dressing to give it a new cutting-edge, in which the bar itself must be reduced and re-formed into a new cutting-point, while my improved tool *e* requires only regrinding to preserve a proper edge, *c*, until the cutter is worn away. It is made of a comparatively long thin piece of steel, *e*, of uniform thickness and width and curved in the arc of a circle. Its curve is regular and extends throughout its length, so that, if desired, both its ends may be formed of cutters of different shapes for different work; but as its curvature is regular from end to end it can be set in or out of its stock, as desired, until it is entirely used up, and I prefer to use only one end as the cutter. The cutter for certain work has its upper side, *f*, beveled sidewise uniformly throughout its length, which gives a much better cutting-edge at the point; but in cutters for finishing or scraping and in cut-off tools this bevel is not made. The cutter-point is made for various kinds of work, in the usual way, with end, top, and side bevels; but with the cutter-bar as I have devised it the top bevel extends its entire length, so that the side and end bevels are only ground to sharpen the tool as it is worn away. The size of the cutter will vary according to the work to be done and the size of the lathe in which it is to be used—that is to say, the sectional area of the bit-strips will vary from one sixty-fourth to one inch and the length from three to twenty inches. The cutter-bit strips are made of Mushet or imperial steel, which requires no tempering, or of ordinary tempered steel, and may be either rolled or forged into the desired curved form and shape. The form of the cutter strip or bit, being curved in the arc of a circle, is important, as it is this that gives the tool always a uniform and desirable cutting-angle as it is worn away. The cutter bit or strip having the curved form lengthwise and the beveled form crosswise gives the best possible form for producing the best possible cutting-edge for roughing and for side work, while for smoothing and for cut-off work the lengthwise curve of the cutter-strip allows it to be used up from one or from both ends and to be formed with the same or with different cutting-edges, and, if desirable, to be reversibly used in the same stock.

The stock *g* is made to suit the size of the cutter-strip, and has a bed or seat, *h*, corresponding to the curve of the cutter-strip, so that the latter when secured in the stock may extend from both ends thereof and be set in or out at either end. The stock is open at its top and at its ends, so as to form a trough, within which the cutter-strip is placed and clamped upon its curved seat by means of a follower, i, having a bearing or clamping surface, n, corresponding to the curve of the cutter-strip, and having a length equal to that of the stock, so as to give a firm bearing upon every part of the cutter within the stock. The follower may be T-shaped in cross-section and the edges of each side of the open stock recessed at j to receive the projecting edges k of the follower, and thus lock the follower to the stock against lengthwise movement, while the screw of the tool-post is clamped hard upon the follower to bind it upon the cutter-strip and the latter upon its curved seat. The stock and its follower may be made of malleable iron, hard brass, phosphor-bronze, or steel castings, and the tool, including its three parts, is to be clamped in the ordinary planer or lathe tool holder in lieu of the single-piece tool. In its use the cutter strip is set out from the stock to the work, and it may be reversed end for end within the stock, or the latter may be reversed end for end.

For convenience in keeping the parts together—that is, the three parts which compose the tool—I prefer to fasten the follower to the stock and upon the cutter-strip, and for this purpose have shown one means in Fig. 2, which consists in the dovetail connection l of the follower and the stock at one end and a set-screw, m, at the other end of the stock, placed so as to bear against an L-shaped arm, n², of the follower, so as to set the latter forward in the dovetail, and thereby fasten and drive the follower down upon the curved cutter-strip. The follower-arm for this purpose extends downward within an opening, r, in the side of the stock, and within the latter beneath the bit-strip in position to receive the adjustment of the screw.

For giving greater strength to the stock it may be made as shown in the cross-section in Fig. 3, in which both the stock and the follower are made of trough form, the trough sides of the follower embracing the trough sides of the stock, the two being firmly clamped together upon the curved cutter-bit when they are bound in the tool-post. The cutter strip or bit may also be curved laterally and the stock correspondingly curved, as shown in Fig. 6, so as to adapt it for use as a boring-tool or for working square up to the lathe face-plate. In this form the cutter becomes right and left handed by simply changing ends. The bit or cutter-strip may also be made in wedge form in vertical cross-section, as shown, and the follower may have a tight wedging fit within the stock upon the bit.

I claim—

1. A bit-holder consisting of a stock having the form of a trough open at its ends, and having an interior curved bottom extending from end to end, and a follower adapted to fit within the open stock, having its inner side curved corresponding to the bottom of the stock, in combination with a bit-strip of uniform cross-section and having a curvature corresponding to the stock and its follower, substantially as described.

2. A bit-holder consisting of a stock having the form of an open-ended trough and a uniformly-curved bottom, and a follower having a corresponding curved form, in combination with a bit-strip of uniform cross-section and of curvature corresponding to the curved surfaces of the stock and follower, and means for fastening the parts together, substantially as described.

3. The stock open at top and ends, having an interior curved bottom, its sides recessed to form the top edge dovetail, and having the side opening, and a follower of T form in cross-section adapted to fit into said recessed sides and having an L-shaped arm adapted to fit into said side opening, in combination with a bit-strip of uniform cross-section and curvature, and a screw entering said stock against the follower to fasten the latter, as described.

In testimony whereof I have hereunto set my hand in the presence of two subscribing witnesses.

JOHN D. HALL.

Witnesses:
F. A. MONAGHAN,
EDW. J. MCMENAMIN, Jr.